US006590787B2

United States Patent
Yasumura

(10) Patent No.: US 6,590,787 B2
(45) Date of Patent: Jul. 8, 2003

(54) WIDE RANGE ZERO VOLTAGE SWITCHING RESONANCE TYPE CONVERTER

(75) Inventor: Masayuki Yasumura, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/998,761

(22) Filed: Nov. 30, 2001

(65) Prior Publication Data

US 2002/0080635 A1 Jun. 27, 2002

(30) Foreign Application Priority Data

Dec. 7, 2000 (JP) .................................... 2000-378000
Dec. 28, 2000 (JP) .................................... 2000-404690

(51) Int. Cl.$^7$ ............................................. H02M 3/335
(52) U.S. Cl. ....................................... 363/21.03; 363/97
(58) Field of Search ........................ 363/16, 20, 21.02, 363/21.03, 95, 97

(56) References Cited

U.S. PATENT DOCUMENTS 5,706,184 A * 1/1998 Mizuta et al. ............ 363/21.02
6,301,129 B1 * 10/2001 Yasumura ................. 363/21.03
6,317,337 B1 * 11/2001 Yasumura ................. 363/21.04

* cited by examiner

Primary Examiner—Adolf Deneke Berhane
(74) Attorney, Agent, or Firm—Jay H. Maioli

(57) ABSTRACT

A complex resonance-type converter provided with a voltage-resonance-type converter on the primary side and a resonant circuit on the secondary side for supplying a plurality of direct-current output voltages from the secondary side, and having an inductance connected in parallel with a primary winding of an isolating converter transformer. A switching output current is distributed to the primary winding of the isolating converter transformer and the inductance, and a current flowing to a switching device and a damper diode inserted in parallel with the switching device has a normal waveform regardless of the level of load current of the secondary-side direct-current output to ensure stable zero voltage switching (ZVS) operation.

6 Claims, 11 Drawing Sheets

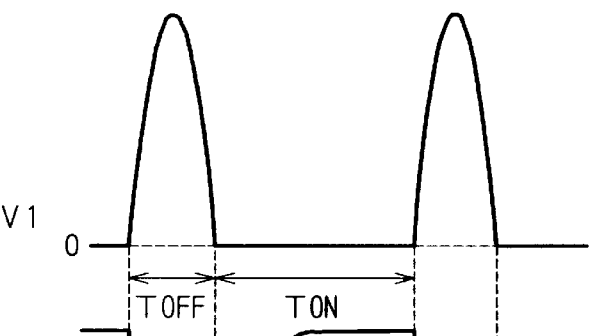

WIDE RANGE ZERO VOLTAGE SWITCHING RESONANCE TYPE CONVERTER

BACKGROUND OF THE INVENTION

The present invention relates to a switching power supply circuit to be provided as a power supply for various electronic apparatus.

Switching power supply circuits employing switching converters such for example as flyback converters and forward converters are widely known. These switching converters form a rectangular waveform in switching operation, and therefore there is a limit to suppression of switching noise. It is also known that because of their operating characteristics, there is a limit to improvement of power conversion efficiency.

Hence, various switching power supply circuits employing resonance type converters have been proposed. A resonance type converter makes it possible to readily obtain high power conversion efficiency, and to achieve low noise because the resonance type converter forms a sinusoidal waveform in switching operation. The resonance type converter has another advantage of being able to be formed by a relatively small number of parts.

FIG. 8 is a circuit diagram showing an example of a related art switching power supply circuit. The fundamental configuration of the power supply circuit shown in the figure has a voltage resonance type converter as a primary-side switching converter.

The power supply circuit shown in the figure generates a rectified and smoothed voltage Ei whose level is equal to that of an alternating input voltage VAC from a commercial alternating-current power by a bridge rectifier circuit Di and a smoothing capacitor Ci.

The voltage resonance type converter for interrupting the rectified and smoothed voltage Ei (direct-current input voltage) inputted thereto includes a switching device Q1 and employs a single-ended system. The voltage resonance type converter employs a self-excited driving method. In this case, a high voltage bipolar transistor (Bipolar Junction Transistor) is selected as the switching device Q1 forming the voltage resonance type converter. A primary-side parallel resonant capacitor Cr is connected in parallel with a collector and an emitter of the switching device Q1. A clamp diode DD is connected between a base and the emitter of the switching device Q1. The parallel resonant capacitor Cr forms a primary-side parallel resonant circuit in conjunction with leakage inductance L1 obtained in a primary winding N1 of an isolating converter transformer PIT, whereby operation of the voltage resonance type converter is obtained.

A self-oscillation driving circuit formed by a driving winding NB, a resonant capacitor CB, and a base current limiting resistance RB is connected to the base of the switching device Q1. The switching device Q1 is driven for switching operation by being supplied with a base current based on an oscillating signal generated by the self-oscillation driving circuit. At the start of power supply, the switching device Q1 is started by a starting current flowing from the rectified and smoothed voltage Ei line to the base of the switching device Q1 via a starting resistance Rs.

In this case, in addition to the clamp diode DD connected between the base and emitter of the switching device Q1, a clamp diode DD1 is connected between the collector and emitter of the switching device Q1.

An orthogonal type control transformer PRT is formed by winging a control winding NC in a winding direction orthogonal to a current detecting winding ND and a driving winding NB. The orthogonal type control transformer PRT is provided to control switching frequency of the primary-side voltage resonance type converter. The structure of the orthogonal type control transformer PRT is a cubic core formed by connecting two table-shaped cores each having four magnetic legs with each other at ends of the magnetic legs. The resonance current detecting winding ND and the driving winding NB are wound around two given magnetic legs of the cubic core in the same winding direction, and the control winding NC is wound around magnetic legs in a direction orthogonal to the resonance current detecting winding ND and the driving winding NB.

An isolating converter transformer PIT (Power Isolation Transformer) is provided to transmit the switching output of the switching converter obtained on the primary side to the secondary side of the switching power supply circuit. The isolating converter transformer PIT is formed by winding the primary winding N1 and secondary winding N2 of the isolating converter transformer PIT around an E—E-shaped core in a state of being divided from each other. Also, a gap G is formed in a central magnetic leg of the E—E-shaped core. Thus, loose coupling at a desired coupling coefficient is obtained, and accordingly a saturated state is not readily obtained.

The primary winding N1 of the isolating converter transformer PIT is connected between the line of the direct-current input voltage and the collector of the switching device Q1. The switching device Q1 performs switching operation on the direct-current input voltage. Thus, the primary winding N1 is supplied with the switching output of the switching device Q1, and thereby generates an alternating voltage having a cycle corresponding to the switching frequency of the switching device Q1.

The alternating voltage induced by the primary winding N1 is generated in the secondary winding N2 on the secondary side of the isolating converter transformer PIT. In this case, a secondary-side parallel resonant capacitor C2 is connected in parallel with the secondary winding N2. Thereby, leakage inductance L2 of the secondary winding N2 and capacitance of the secondary-side parallel resonant capacitor C2 form a parallel resonant circuit. The parallel resonant circuit converts the alternating voltage induced in the secondary winding N2 into a resonance voltage. Thus, a voltage resonance operation is obtained on the secondary side.

Thus, the power supply circuit is provided with the parallel resonant circuit to convert switching operation into voltage resonance type operation on the primary side and the parallel resonant circuit to provide voltage resonance operation on the secondary side. The switching converter provided with such resonant circuits on the primary side and the secondary side is referred to as a "complex resonance type switching converter."

On the secondary side of the isolating converter transformer PIT in this case, an anode of a rectifier diode D01 is connected to a winding end point of the secondary winding N2, and a cathode of the rectifier diode D01 is connected to a positive electrode terminal of a smoothing capacitor C01, thereby forming a half-wave rectifier circuit. The half-wave rectifier circuit provides a secondary-side direct-current output voltage E01 across the smoothing capacitor C01.

In this case, the secondary winding N2 is provided with a tap, and a half-wave rectifier circuit formed by a rectifier diode D02 and a smoothing capacitor C02 is connected to the tap output, as shown in the figure. The half-wave rectifier circuit provides a secondary-side direct-current output voltage E02 that is lower than the secondary-side direct-current output voltage E01. Incidentally, the secondary-side direct-current output voltage E01 is 135 V, and the secondary-side direct-current output voltage E02 is 15 V, for example.

The secondary-side direct-current output voltages E01 and E02 are each supplied to a required load circuit. The secondary-side direct-current output voltage E01 is outputted from a branch point as a detection voltage for a control circuit 1, and the secondary-side direct-current output voltage E02 is outputted from a branch point as operating power for the control circuit 1.

The control circuit 1 supplies the control winding NC of the orthogonal type control transformer PRT with a direct current that is variably changed according to the level of the secondary-side direct-current output voltage E01 as a control current. In response to the change in the level of the control current flowing through the control winding NC, the orthogonal type control transformer PRT variably controls the inductance LB of the driving winding NB. This results in a change in resonance frequency of the resonant circuit formed by the driving winding NB and the resonant capacitor CB in the self-oscillation driving circuit. The switching frequency of the switching device Q1 is thereby variably controlled. The switching frequency of the switching device Q1 is thus changed to control the secondary-side direct-current output voltage at a constant level. Thus, the power supply is stabilized.

Assuming that a relation of Po1>>Po2 holds for load powers Po1 and Po2 of the secondary-side direct-current output voltages E01 and E02, the circuit shown in FIG. 8 forms operating waveforms as shown in FIGS. 9A to 9C under a condition of a maximum load power.

FIG. 9A shows a parallel resonance voltage V1 obtained across the primary-side parallel resonant capacitor Cr. As shown in the figure, the parallel resonance voltage V1 is at a zero level during a period TON during which the switching device Q1 is turned on, and forms a sinusoidal pulse waveform during a period TOFF during which the switching device Q1 is turned off.

As shown in FIG. 9B, a switching current Icp flowing to a parallel circuit of the switching device Q1 and the clamp diode DD1 is at a zero level during the period TOFF. During the period TON, the switching current Icp forms a waveform such that a damper current in a direction of negative polarity first flows and thereafter a collector current in a direction of positive polarity flows. As shown in FIG. 9C, during the period TON, a damper current ID1 flowing through the clamp diode DD1 forms a waveform of positive polarity in the damper current period of the switching current Icp of FIG. 9B.

As is understood from these waveforms, the parallel resonance voltage V1 shown in FIG. 9A is obtained during only the period TOFF, while the switching current Icp and the damper current ID1 shown in FIGS. 9B and 9C, respectively, are obtained only during the period TON. Hence, normal "ZVS (Zero Voltage Switching) operation" is obtained.

When the power supply circuit shown in FIG. 8 is to be incorporated in a television receiver, for example, supply voltages having different levels are supplied as secondary-side direct-current output voltages to various circuit units. Therefore, it is necessary to generate and output not only the secondary-side direct-current output voltages E01 and E02 but also other secondary-side direct-current output voltages.

A configuration on the secondary side of the isolating converter transformer PIT in this case is shown in FIG. 10. In the figure, the same parts as in FIG. 8 are identified by the same reference numerals, and their description will be omitted.

The figure shows that five direct-current voltages, that is, secondary-side direct-current output voltages E01 to E05 are generated.

The secondary-side direct-current output voltage E01 is obtained by the same circuit configuration as in FIG. 8. Specifically, the secondary-side direct-current output voltage E01 is obtained by the half-wave rectifier circuit formed by the rectifier diode D01 and the smoothing capacitor C01 and connected to the secondary winding N2.

The tap output of the secondary winding N2 is connected with the rectifier diode D02 and the smoothing capacitor C02, and further the smoothing capacitor C02 and a smoothing capacitor C03 to be described later are connected in series with each other. Thus, a current rectifying path is formed by the rectifier diode D02 and a series connection circuit of the smoothing capacitors C02 and C03, whereby a secondary-side direct-current output voltage E02 of 15 V, for example, is obtained across the smoothing capacitors C02 and C03.

Further, a center tap is provided between the tap output for the secondary-side direct-current output voltage E02 and the winding start point of the secondary winding N2, and a half-wave rectifier circuit of a rectifier diode D03 and a smoothing capacitor C03 is provided for the center tap, as shown in the figure, whereby a secondary-side direct-current output voltage E03 of 7.5 V, for example, is obtained.

In this case, a step-up winding N3 having a given number of turns is formed by winding an additional wire from the winding end point side of the secondary winding N2. The step-up winding N3 is connected with a rectifier diode D04 and a smoothing capacitor C04 as shown in the figure. A negative electrode terminal of the smoothing capacitor C04 is connected to a positive electrode terminal of the smoothing capacitor C01, thereby forming a series connection circuit of the smoothing capacitors C04 and C01. Thus, a current rectifying path is formed by the rectifier diode D04 and the series connection circuit of the smoothing capacitors C04 and C01, whereby a secondary-side direct-current output voltage E04 of 200 V is obtained across the smoothing capacitors C04 and C01.

Furthermore, in this case, an independent secondary winding N4 is wound on the secondary side of the isolating converter transformer PIT independently of the secondary winding N2 and the step-up winding N3. As shown in the figure, a half-wave rectifier circuit of a rectifier diode D05 and a smoothing capacitor C05 is provided for the independent secondary winding N4, whereby a secondary-side direct-current output voltage E05 of 24 V, for example, is obtained.

SUMMARY OF THE INVENTION

When the power supply circuit employs the configuration for generating and outputting a relatively large number of secondary-side direct-current output voltages as shown in FIG. 10, power obtained from the secondary-side winding N2 accompanied by the resonant capacitor C2 is less than power obtained from another secondary-side winding N4, the same parts as those of FIGS. 9A to 9C exhibit waveforms as shown in FIGS. 11A to 11C. As is shown by the waveforms of the switching current Icp and the damper current ID1 of FIGS. 11B and 11C, the absolute value levels of the currents flowing during the damper period are lower than those shown in FIGS. 9B and 9C. This means that a margin of a ZVS operation range is reduced.

When a load power of 115 V outputted from E01 is decreased in this condition, for example, the waveforms shown in FIGS. 11A to 11C are changed into states as shown in FIGS. 11D to 11F, respectively.

Specifically, as shown in FIG. 11F, the damper current ID1 that should flow through the clamp diode DD1 does not flow. As shown in FIGS. 11D and 11E, the parallel resonance voltage V1 and the switching current Icp both form abnormal operating waveforms. Thus, normal ZVS operation is not performed. Such abnormal operation significantly increases power loss, and an increase in the temperature of heat generated by the power loss may result in failure of devices such as the switching device Q1, for example.

As a measure against this, the resonance frequency of the secondary-side parallel resonant circuit may be set low by increasing the capacitance of the secondary-side parallel resonant capacitor C2. In this case, however, current flowing through the secondary winding N2 and the secondary-side parallel resonant capacitor C2 is increased, and thus the maximum load power that can be handled is decreased.

It is possible to secure the maximum load power when a turns ratio between the primary side and the secondary side is made larger by increasing the number of turns of the windings wound on the secondary side of the isolating converter transformer PIT or decreasing the number of turns of the primary winding N1, for example. In this case, however, power conversion efficiency is lowered, and power loss in the isolating converter transformer PIT and the switching device Q1 is increased, which results in a large amount of heat generated by the power loss.

In view of the above problems, a switching power supply circuit according to the present invention is configured as follows.

To achieve the above object, according to a first aspect of the present invention, there is provided a switching power supply circuit, including: switching means formed by including a switching device driven by switching driving for performing switching operation on a direct-current input voltage inputted thereto; a first isolating converter transformer for transmitting an output of the switching means obtained on a primary side of the first isolating converter transformer to a secondary side of the first isolating converter transformer; a primary-side parallel resonant circuit formed by a primary-side winding included in the first isolating converter transformer and a primary-side parallel resonant capacitor for converting operation of the switching means into voltage resonance type operation; and an inductance connected in parallel with the primary-side winding.

According to a second aspect of the present invention, there is provided a switching power supply circuit, including: a secondary-side resonant circuit formed by connecting a secondary-side resonant capacitor in parallel with a first secondary-side winding of the plurality of secondary-side windings; a first direct-current output voltage generating means for providing a first secondary-side direct-current output voltage by performing rectifying operation on an alternating voltage obtained in the first secondary-side winding and inputted to the first direct-current output voltage generating means; and a second direct-current output voltage generating means for providing a second secondary-side direct-current output voltage by performing rectifying operation on an alternating voltage obtained in another secondary-side winding than the first secondary-side winding and inputted to the second direct-current output voltage generating means, and for supplying more load power than the first direct-current output voltage generating means.

The switching power supply circuit has a configuration of a so-called complex resonance type switching converter, which is provided with the primary-side parallel resonant circuit for a voltage resonance type converter provided on the primary side and the secondary-side resonant circuit formed by the secondary-side resonant capacitor and the secondary-side winding on the secondary side.

A constant-voltage method in this case is a switching frequency control method that changes the switching frequency of the switching device.

With an inductor connected in parallel with the primary winding of the isolating converter transformer in such a configuration, the current flowing to the switching device has a normal waveform regardless of the level of load power. Therefore, it is possible to secure a margin of a ZVS operation range.

Thus, the connection of the inductance component eliminates the need to increase the capacitance of the secondary-side parallel resonant capacitor for normal ZVS operation when the load power is decreased. This results in a reduction of input power and an improvement in power conversion efficiency at a maximum load power in particular. In addition, as a result of this, generation of heat in the isolating converter transformer and the switching device forming the voltage resonance type converter is effectively controlled.

BRIEF DESCRIPTION OF THE DRAWINGS

FIGS. 11A to 11F are waveform diagrams showing operations of main parts of the switching power supply circuit employing the secondary-side configuration shown in FIG. 10.

DETAILED DESCRIPTION OF THE INVENTION

Figure 1:
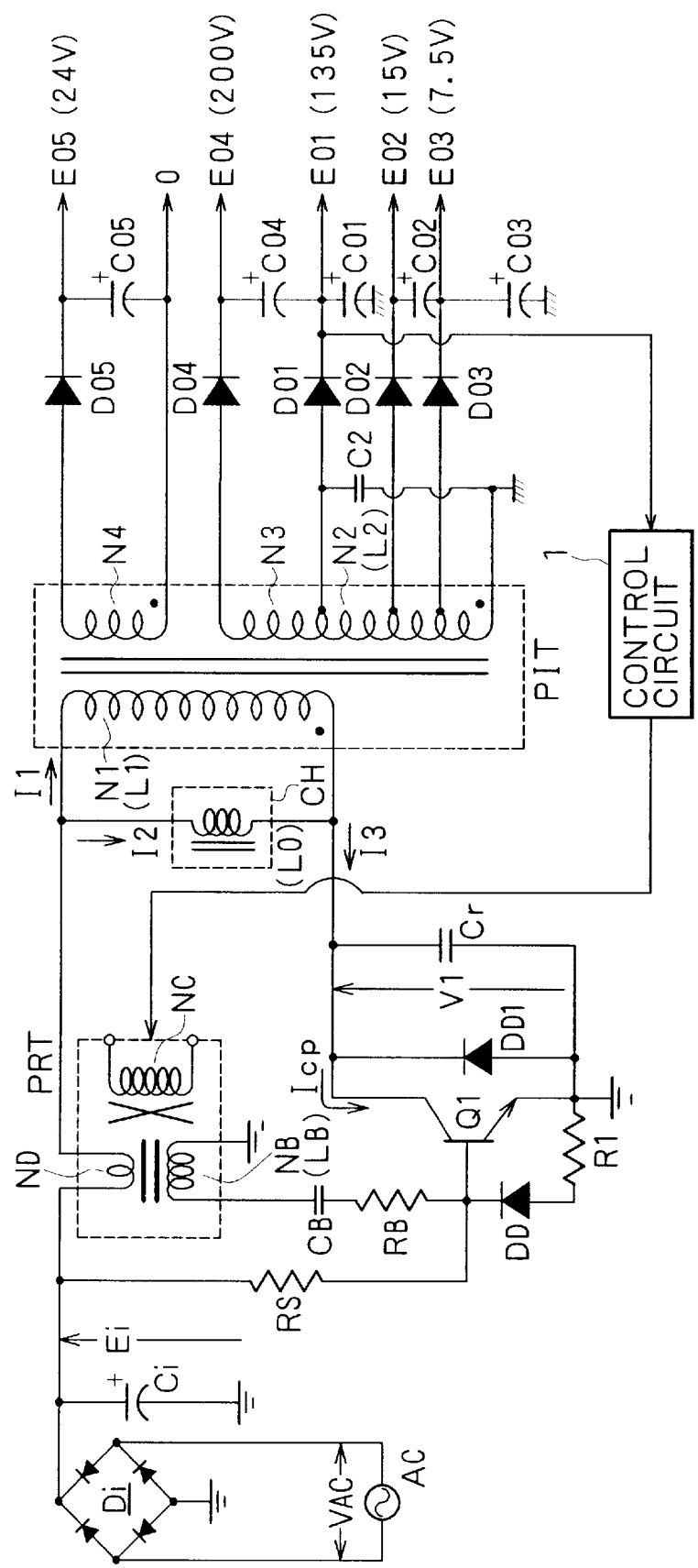
FIG. 1 is a circuit diagram showing a configuration of a switching power supply circuit according to a first embodiment of the present invention.

FIG. 1 shows a configuration of a switching power supply circuit according to a first embodiment of the present invention.

The power supply circuit shown in FIG. 1 has a configuration of a complex resonance type switching converter provided with a voltage resonance type converter on the primary side and a parallel resonant circuit on the secondary side.

The power supply circuit shown in FIG. 1 is provided with a full-wave rectifier circuit including a bridge rectifier circuit Di and a smoothing capacitor Ci as a rectifying and smoothing circuit supplied with an alternating input voltage VAC to provide a direct-current input voltage. The full-wave rectifier circuit generates a rectified and smoothed voltage Ei whose level is equal to that of the alternating input voltage VAC.

The voltage resonance type switching converter provided in the power supply circuit is a self-excited converter including a switching device Q1. In this case, a high voltage bipolar transistor (BJT; Bipolar Junction Transistor) is employed as the switching device Q1.

Connected between a base of the switching device Q1 and a primary-side ground is a series resonant circuit for self-oscillation driving that is formed by connecting a driving winding NB, a resonant capacitor CB, and a base current limiting resistance RB in series with each other.

The base of the switching device Q1 is also connected to a positive electrode side of the smoothing capacitor Ci via a starting resistance RS, whereby a base current at the time of turn-on is obtained from the rectifying and smoothing line.

A series connection circuit of a clamp diode DD and a resistance R1 is connected between the base of the switching device Q1 and a negative electrode of the smoothing capacitor Ci, thereby forming a path of a clamp current that flows during an off period of the switching device Q1. A collector of the switching device Q1 is connected to one end of a primary winding N1 of an isolating converter transformer PIT, while an emitter of the switching device Q1 is grounded.

A parallel resonant capacitor Cr is connected in parallel with the collector and emitter of the switching device Q1. Capacitance of the parallel resonant capacitor Cr and inductance L1 on the primary winding N1 side of the isolating converter transformer PIT to be described later form a primary-side parallel resonant circuit of the voltage resonance type converter. Though its detailed description will be omitted, during the off period of the switching device Q1, a voltage V1 across the parallel resonant capacitor Cr practically forms a sinusoidal pulse waveform as a result of the effect of the parallel resonant circuit, and thus a voltage resonance type operation is obtained.

In this case, a clamp diode DD1 is also connected in parallel with the collector and emitter of the switching device Q1.

An orthogonal type control transformer PRT shown in FIG. 1 is a saturable reactor provided with a resonance current detecting winding ND, the driving winding NB, and a control winding NC. The orthogonal type control transformer PRT is provided to drive the switching device Q1 and effect control for constant voltage by a switching frequency control method.

The structure of the orthogonal type control transformer PRT is a cubic core, not shown, formed by connecting two table-shaped cores each having four magnetic legs with each other at ends of the magnetic legs. The resonance current detecting winding ND and the driving winding NB are wound around two given magnetic legs of the cubic core in the same winding direction, and the control winding NC is wound in a direction orthogonal to the resonance current detecting winding ND and the driving winding NB.

In this case, the resonance current detecting winding ND of the orthogonal type control transformer PRT is inserted in series between the positive electrode of the smoothing capacitor Ci and the primary winding N1 of the isolating converter transformer PIT, so that switching output of the switching device Q1 is transmitted to the resonance current detecting winding ND via the primary winding N1. The switching output obtained in the resonance current detecting winding ND of the orthogonal type control transformer PRT is induced in the driving winding NB via transformer coupling, whereby an alternating voltage is generated as driving voltage in the driving winding NB. The driving voltage is outputted as driving current from a series resonant circuit of the driving winding NB and the capacitor CB, which forms the self-oscillation driving circuit, to the base of the switching device Q1 via the base current limiting resistance RB. Thus, the switching device Q1 performs switching operation at a switching frequency determined by the resonance frequency of the series resonant circuit.

The isolating converter transformer PIT transmits the switching output of the switching device Q1 to the secondary side of the switching power supply circuit.

Figure 5:
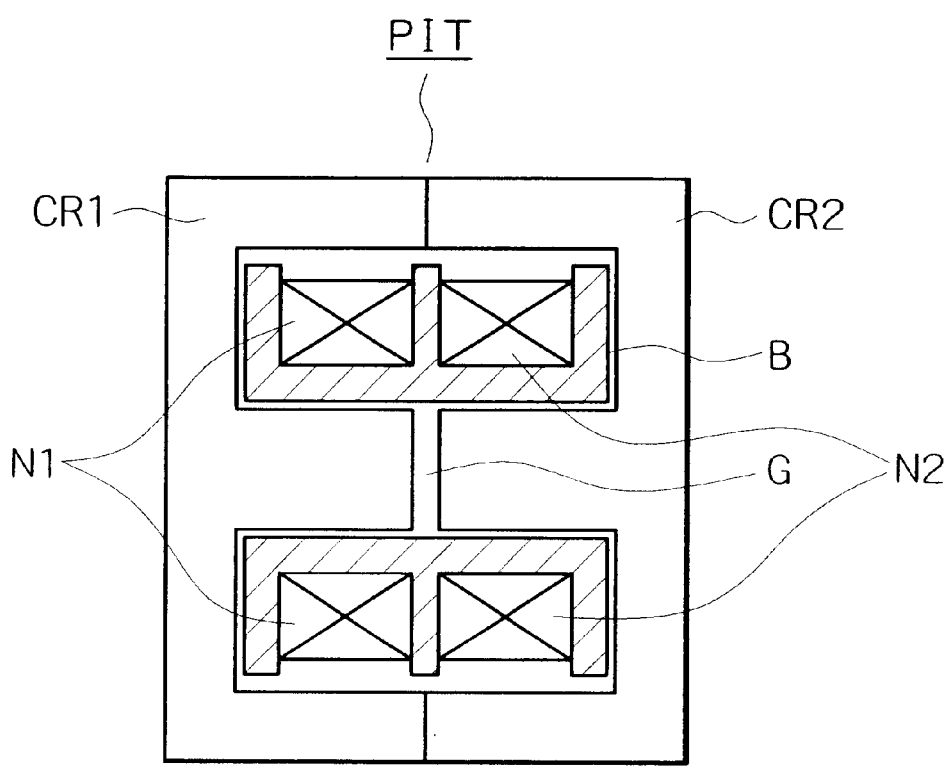
FIG. 5 is a sectional view of an isolating converter transformer.

As shown in FIG. 5, the isolating converter transformer PIT has an E—E-shaped core formed by combining E-shaped cores CR1 and CR2 made for example of a ferrite material in such a manner that magnetic legs of the core CR1 are opposed to magnetic legs of the core CR2. The primary winding N1 and a secondary winding N2 are wound around a central magnetic leg of the E—E-shaped core in a state of being divided from each other by a dividing bobbin B. Also, a gap G is formed in the central magnetic leg, as shown in FIG. 5. Thus, loose coupling at a desired coupling coefficient is obtained.

As described later, windings wound on the secondary side of the power supply circuit according to the first embodiment include not only the secondary winding N2 but also a step-up winding N3 formed by winding a wire of the secondary winding N2 and an independent secondary winding N4 wound independently of the secondary winding N2. The step-up winding N3 and the independent secondary winding N4 are not shown in the figure for convenience of description. However, the windings N3 and N4 are practically wound in a divided region of the dividing bobbin B in which region the secondary winding N2 is wound, for example.

The gap G can be formed by making the central magnetic leg of each of the E-shaped cores CR1 and CR2 shorter than two outer magnetic legs of each of the E-shaped cores CR1 and CR2. The coupling coefficient k is 0.85, for example, to provide loose coupling, and it is correspondingly difficult to reach a saturated state.

As shown in FIG. 1, a winding start point of the primary winding N1 of the isolating converter transformer PIT is connected to the collector of the switching device Q1, whereas a winding end point of the primary winding N1 is connected to the positive electrode of the smoothing capacitor Ci via the resonance current detecting winding ND. Hence, the primary winding N1 is supplied with the switching output of the switching device Q1 to thereby generate an alternating voltage having a cycle corresponding to the switching frequency of the switching device Q1.

In the first embodiment, a choke coil CH as an inductance device is connected in parallel with the primary winding N1.

The alternating voltage induced by the primary winding N1 is generated in each of the windings N2, N3, and N4 wound on the secondary side of the isolating converter transformer PIT.

In this case, a secondary-side parallel resonant capacitor C2 is connected in parallel with the secondary winding N2. Thereby, leakage inductance L2 of the secondary winding N2 and capacitance of the secondary-side parallel resonant capacitor C2 form a secondary-side parallel resonant circuit.

The secondary-side parallel resonant circuit converts the alternating voltage induced in the secondary winding N2 into a resonance voltage, whereby a voltage resonance operation is obtained on the secondary side. Thus, the power supply circuit also employs the configuration of a "complex resonance type switching converter" provided with the parallel resonant circuit to convert switching operation into voltage resonance type operation on the primary side and the parallel resonant circuit to provide voltage resonance operation on the secondary side.

The power supply circuit according to the first embodiment is incorporated into a television receiver, for example. As shown in FIG. 1, five secondary-side direct-current output voltages E01 to E05 are generated on the secondary side of the isolating converter transformer PIT and then outputted to the television receiver.

A configuration for generating the secondary-side direct-current output voltages E01 to E05 on the secondary side is as follows.

A half-wave rectifier circuit formed by a rectifier diode D01 and a smoothing capacitor C01 is provided on a winding end side of the secondary winding N2 connected in parallel with the secondary-side parallel resonant capacitor C2, whereby a secondary-side direct-current output voltage E01 of 135 V is obtained across the smoothing capacitor C01.

The secondary winding N2 is provided with a tap output, and the tap output is connected with a rectifier diode D02 and a smoothing capacitor C02 as shown in FIG. 1. Further, a center tap is provided between the tap output and a winding start point of the secondary winding N2, and a half-wave rectifier circuit of a rectifier diode D03 and a smoothing capacitor C03 is formed for the center tap, as shown in FIG. 1. The half-wave rectifier circuit provides a secondary-side direct-current output voltage E03 of 7.5 V.

In this case, a negative electrode terminal of the smoothing capacitor C02 is connected to a positive electrode terminal of the smoothing capacitor C03, thereby forming a series connection circuit of the smoothing capacitors C02 and C03. Thus, it may be considered that the first half-wave rectifier circuit of the rectifier diode D02 and the smoothing capacitor C02 is piled up on the second half-wave rectifier circuit of the rectifier diode D03 and the smoothing capacitor C03. As for operation, the secondary winding N2, the rectifier diode D02, the smoothing capacitor C02, and the smoothing capacitor C03 form a current rectifying path, and thereby perform half-wave rectifying operation. As a result, a secondary-side direct-current output voltage E02 of 15 V is obtained across the series connection circuit of the smoothing capacitor C02 and the smoothing capacitor C03.

In this case, the step-up winding N3 having a given number of turns is formed by winding an additional wire from the winding end point side of the secondary winding N2. The step-up winding N3 is connected with a rectifier diode D04 and a smoothing capacitor C04 as shown in FIG. 1. In this case, a negative electrode terminal of the smoothing capacitor C04 is connected to a positive electrode terminal of the smoothing capacitor C01, thereby forming a series connection circuit of the smoothing capacitors C04 and C01. Thus, also in this case, the third half-wave rectifier circuit of the rectifier diode D04 and the smoothing capacitor C04 is piled up on the fourth half-wave rectifier circuit of the rectifier diode D01 and the smoothing capacitor C01. The rectifier diode D04, the smoothing capacitor C04, and the smoothing capacitor C01 form a current rectifying path, and thereby perform half-wave rectifying operation. As a result, a secondary-side direct-current output voltage E04 of 200 V is obtained across the series connection circuit of the smoothing capacitor C04 and the smoothing capacitor C01.

Furthermore, in this case, the secondary winding N4 having a given number of turns is wound on the secondary side of the isolating converter transformer PIT independently of the secondary winding N2 and the step-up winding N3. As shown in FIG. 1, a half-wave rectifier circuit of a rectifier diode D05 and a smoothing capacitor C05 is provided for the secondary winding N4, whereby a secondary-side direct-current output voltage E05 of 24 V is obtained.

Examples of use of the secondary-side direct-current output voltages E01 to E05 will be given in the following.

The secondary-side direct-current output voltage E01 (135 V) is supplied to a horizontal deflection circuit, and the secondary-side direct-current output voltage E02 (15 V) is supplied to an analog signal circuit. The secondary-side direct-current output voltage E03 (7.5 V) is supplied to a digital signal circuit, the secondary-side direct-current output voltage E04 (200 V) is supplied to a video output circuit, and the secondary-side direct-current output voltage E05 (24 V) is supplied to an audio output circuit.

Also, a control circuit 1 uses the secondary-side direct-current output voltage E01 as a detection voltage and as power for operating the control circuit 1.

The control circuit 1 variably controls the inductance LB of the driving winding NB wound in the orthogonal type control transformer PRT by changing the level of a control direct current flowing through the control winding NC of the orthogonal type control transformer PRT according to change in the level of the secondary-side direct-current output voltage E01. This results in a change in resonance conditions of the series resonant circuit including the inductance LB of the driving winding NB in the circuit for self-oscillation driving of the switching device Q1. This represents an operation of changing the switching frequency of the switching device Q1, by which operation the secondary-side direct-current output voltages are stabilized.

FIGS. 4A to 4J are waveform diagrams showing operations of main parts of the power supply circuit configured as shown in FIG. 1. FIGS. 4A to 4E show operating waveforms of the parts at a maximum load power, whereas FIGS. 4F to 4J show operating waveforms of the same parts as those of FIGS. 4A to 4E, respectively, at a minimum load power.

Figure 4:
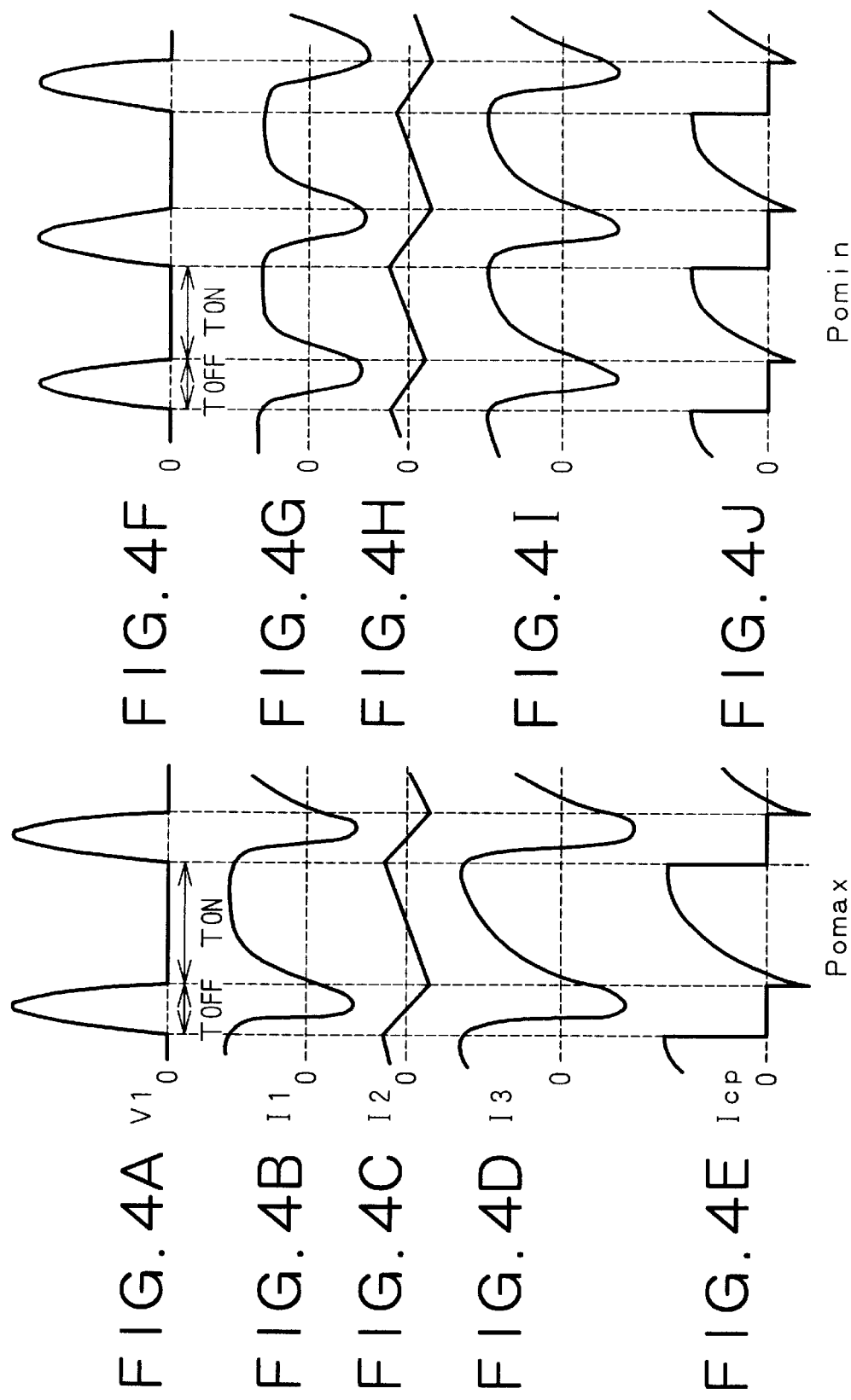
FIGS. 4A to 4J are waveform diagrams showing operations of main parts of the switching power supply circuit according to the first embodiment of the present invention.

As shown in FIG. 4A and FIG. 4F, a primary-side parallel resonance voltage V1 obtained across the primary-side parallel resonant capacitor Cr is at a zero level during a period TON during which the switching device Q1 is turned on, and forms a sinusoidal pulse waveform during a period TOFF during which the switching device Q1 is turned off. As shown by comparison of the primary-side parallel resonance voltage V1 of FIG. 4A and FIG. 4F, the period TON is shortened as the load becomes lighter. This indicates the operation of the switching frequency control method, which fixes the period TOFF and changes the period TON.

As shown in FIGS. 4C and 4H, a coil current I2 flowing through the choke coil CH forms sawtooth waves of positive polarity and negative polarity that are symmetrical to each other. A primary winding current I1 flowing through the winding end point side of the primary winding N1 in this case is shown in FIGS. 4B and 4G. The primary winding current I1 has substantially the same waveform as when the choke coil CH is not inserted, for example, and the waveform itself has a small margin of a ZVS operation range.

A primary winding current I3 flowing from the winding start point of the primary winding N1 to the switching device Q1 in this case is a combination of the coil current I2 and the primary winding current I1, and flows while forming waveforms as shown in FIGS. 4C and 4I at the maximum load power and the minimum load power, respectively.

As a result of the primary winding current I3 having such waveforms, as shown in FIGS. 4E and 4J, a collector current Icp flowing to the collector of the switching device Q1 is at a zero level during the period TOFF. During the period TON, the collector current Icp has a period of damper current of negative polarity, and thereafter flows to the collector with a positive polarity level.

As is understood from the waveforms of FIGS. 4E and 4J, the collector current Icp has normal waveforms regardless of change in the condition of the load power from maximum to minimum. Hence, a margin of a ZVS operation range for the collector current Icp is enlarged.

Depending on selection of the inductance Lo of the choke coil CH, the margin of a ZVS operation range for the collector current Icp can be secured even when the switching frequency rises to a highest value within a variable range at the minimum load power. As a result, ZVS operation of the switching device Q1 is ensured.

Although the choke coil CH added to the power supply circuit according to the first embodiment increases power loss resulting from a current flowing through the choke coil CH, the choke coil CH makes it possible to reduce input power, and consequently improve power conversion efficiency.

Specifically, since the first embodiment increases the margin of the ZVS operation range by adding the choke coil CH, capacitance of the secondary-side parallel resonant capacitor C2 does not need to be increased, and therefore the secondary-side parallel resonant circuit can maintain a high resonance frequency. Thus, the maximum load power that can be handled is not decreased.

Figure 8:
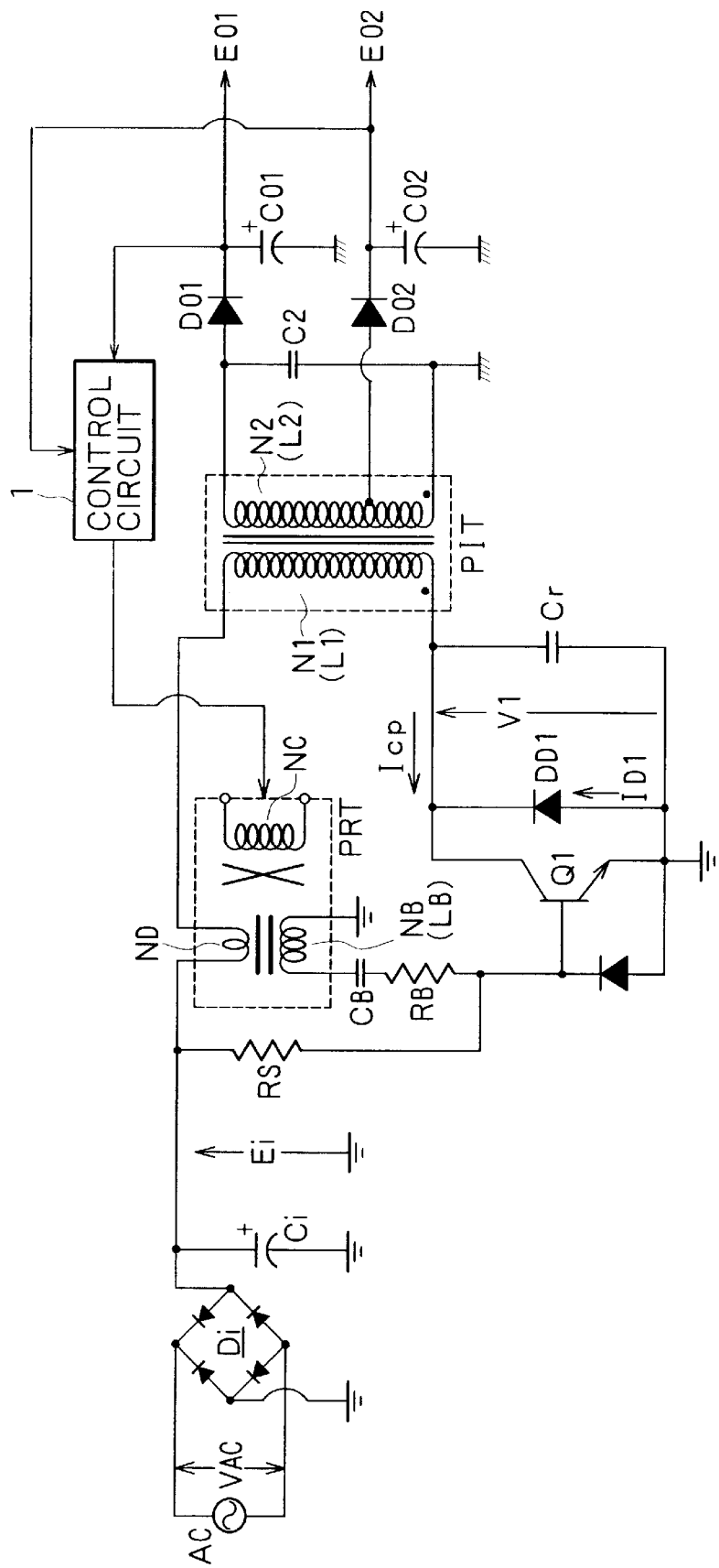
FIG. 8 is a circuit diagram showing a configuration of a related art switching power supply circuit.
Figure 9:
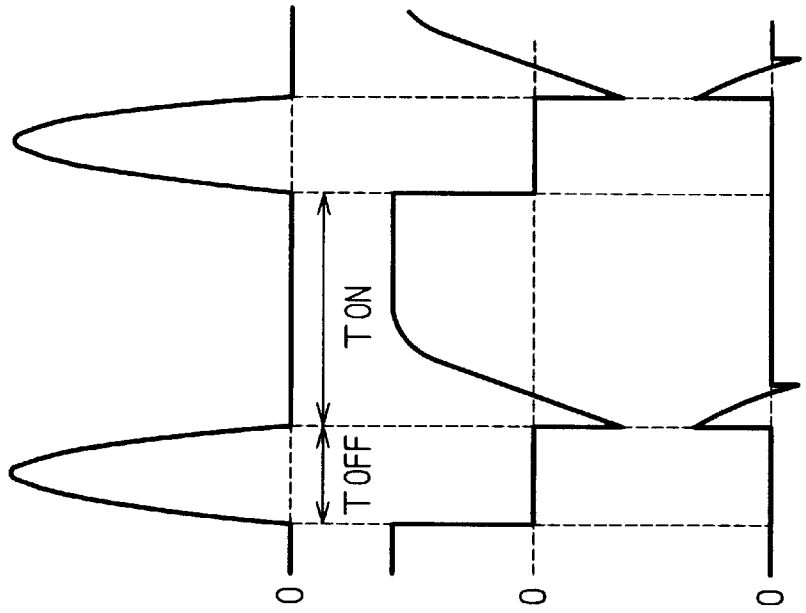
FIGS. 9A to 9C are waveform diagrams showing operations of main parts of the switching power supply circuit shown in FIG. 8.
Figure 10:
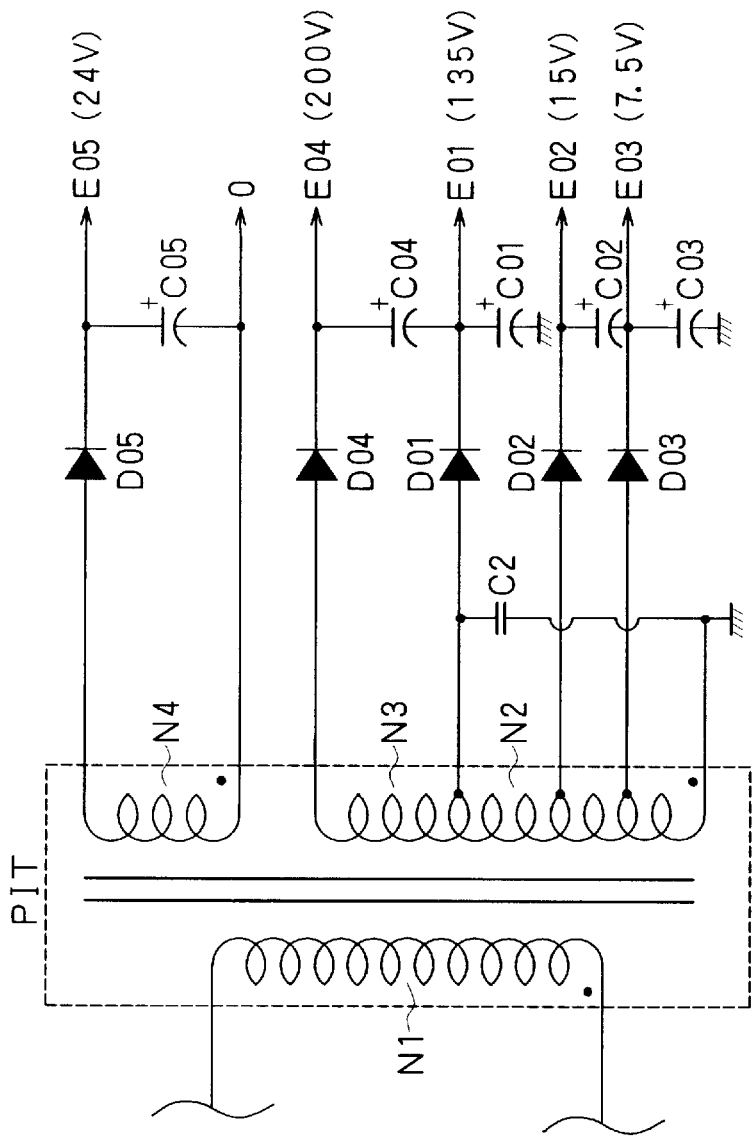
FIG. 10 is a circuit diagram showing a configuration provided for a television receiver on the secondary side of the switching power supply circuit shown in FIG. 8.

Thus, when the number of turns of the primary winding N1 is increased and the maximum load power that can be handled is set at about the same level as in the circuit of FIG. 8, the level of the primary winding currents I1 and I3 and the collector current Icp is lower than that of the circuit of FIG. 8. Also, the level of resonance current of the secondary-side parallel resonant circuit flowing through the secondary winding N2 is lowered. Thus, power loss in the switching device Q1 and the isolating converter transformer PIT is reduced, and overall input power of the circuit as a whole is reduced.

Values selected for main components in the power supply circuit according to the first embodiment shown in FIG. 1 are recited in the following for reference.

The primary winding N1=73 T; its self-inductance is 1.5 mH; and its leakage inductance L1=350 $\mu$H.

The secondary winding N2=50 T; the step-up winding N3=24 T; and the independent secondary winding N4=9 T.

Then, selection of the inductance Lo of the choke coil=1 mH enables selection of the secondary-side parallel resonant capacitor C2=0.01 $\mu$F; this constant makes it possible to handle a maximum load power of up to 150 W.

For comparison, values selected for main components in the power supply circuit of FIG. 8 are given in the following. The primary winding N1=65 T; its self-inductance is 1.2 mH; and its leakage inductance L1=330 $\mu$H.

The secondary winding N2=50 T; the step-up winding N3=24 T; and the independent secondary winding N4=9 T. Then, by selecting the secondary-side parallel resonant capacitor C2=0.015 $\mu$F, ZVS operation is ensured in a range of load power of 100 W to 150 W.

Experimental results obtained when the components are selected as described above show that the circuit shown in FIG. 8 has a power conversion efficiency $\eta$ AC→DC=89.6% and an input power of 167.4 W, whereas the power supply circuit according to the first embodiment shown in FIG. 1 has a power conversion efficiency $\eta$ AC→DC=90.4%, which represents an improvement of 0.8%, and an input power of 165.9 W, which represents a reduction of about 1.5 W.

Figure 2:
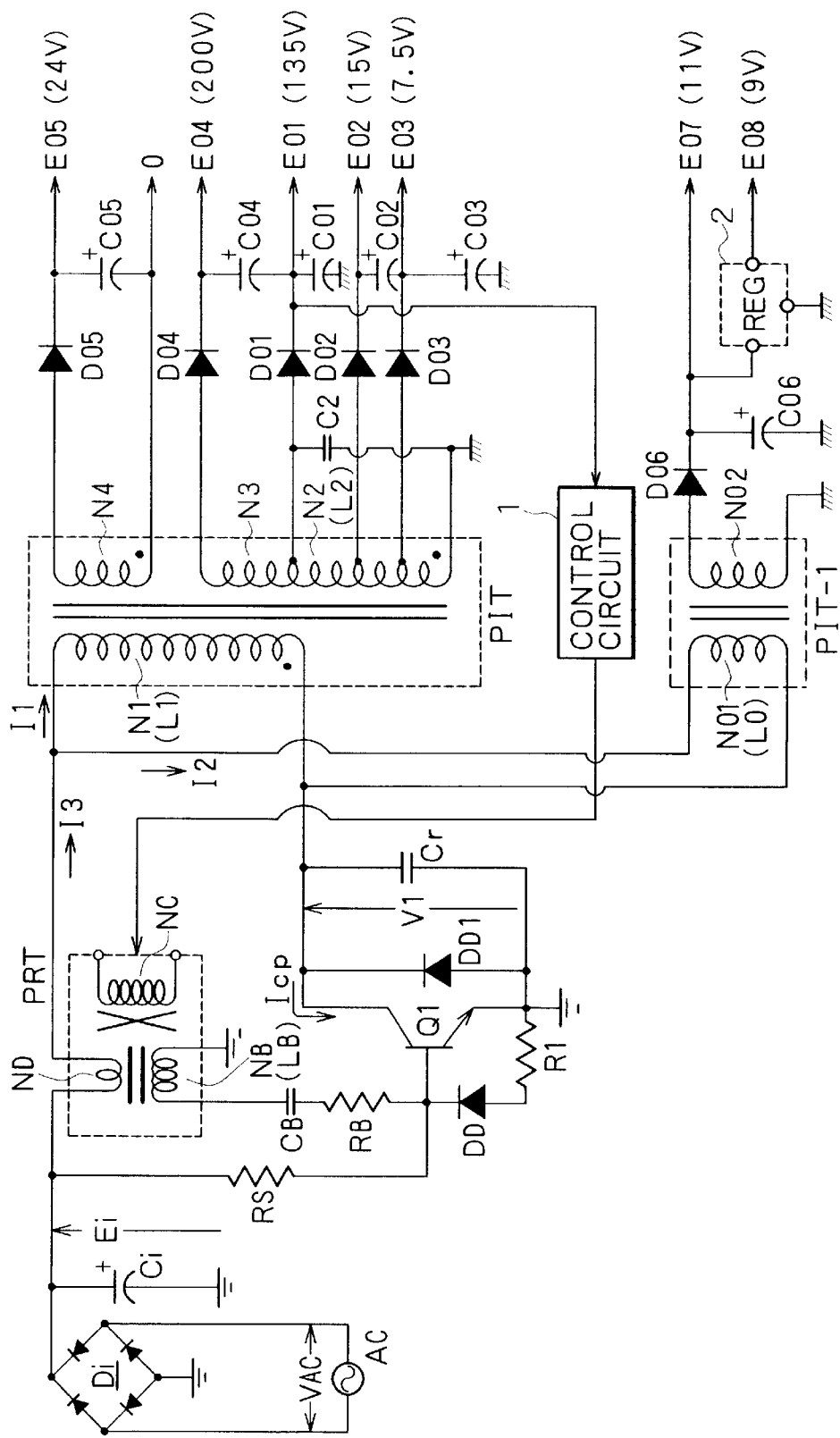
FIG. 2 is a circuit diagram showing a configuration of a switching power supply circuit according to a second embodiment of the present invention.

FIG. 2 shows a configuration of a switching power supply circuit according to a second embodiment of the present invention. In FIG. 2, the same parts as in FIG. 1 are identified by the same reference numerals, and their description will be omitted.

The choke coil CH shown in the foregoing circuit of FIG. 1 is omitted from the power supply circuit shown in FIG. 2. Instead, an isolating converter transformer PIT-1 is additionally provided in the power supply circuit shown in FIG. 2. The isolating converter transformer PIT-1 may have substantially the same structure as that of FIG. 5, for example, and a primary winding N01 is wound on the primary side of the isolating converter transformer PIT-1, while a secondary winding N02 is wound on the secondary side of the isolating converter transformer PIT-1.

In the second embodiment, the primary winding N01 of the isolating converter transformer PIT-1 is connected in parallel with a primary winding N1 of an isolating converter transformer PIT. Thus, the circuit shown in FIG. 2 is provided with the primary winding N01 of the isolating converter transformer PIT-1 instead of the choke coil CH, thereby obtaining an inductance Lo to be connected in parallel with the primary winding N1 of the isolating converter transformer PIT.

In this case, a half-wave rectifier circuit formed by a rectifier diode D06 and a smoothing capacitor C06 is connected to the secondary winding N02 on the secondary side of the isolating converter transformer PIT-1, and provides an unstabilized secondary-side direct-current output voltage E07. The secondary-side direct-current output voltage E07 is also inputted from a branch point to a three-terminal regulator 2, whereby a secondary-side direct-current output voltage E08 of 9 V stabilized by the three-terminal regulator 2 is obtained.

Such a configuration can provide the same operating waveforms as in FIGS. 4A to 4J, and ensure ZVS operation even under a condition of light load, as in the circuit of FIG. 1. In addition, by employing the configuration based on the same reasons as described with respect to the circuit of FIG. 1, it is possible to improve power conversion efficiency of the circuit as a whole and reduce input power.

The configuration shown in FIG. 2 is especially advantageous when the number of pin terminals of the isolating converter transformer is limited and therefore output systems for secondary-side direct-current output voltages can no longer be increased, because the configuration makes it possible to readily increase the output systems. Incidentally, in this case, it is desirable that the load power on the secondary side of the isolating converter transformer PIT-1 be 5 W or less.

Figure 3:
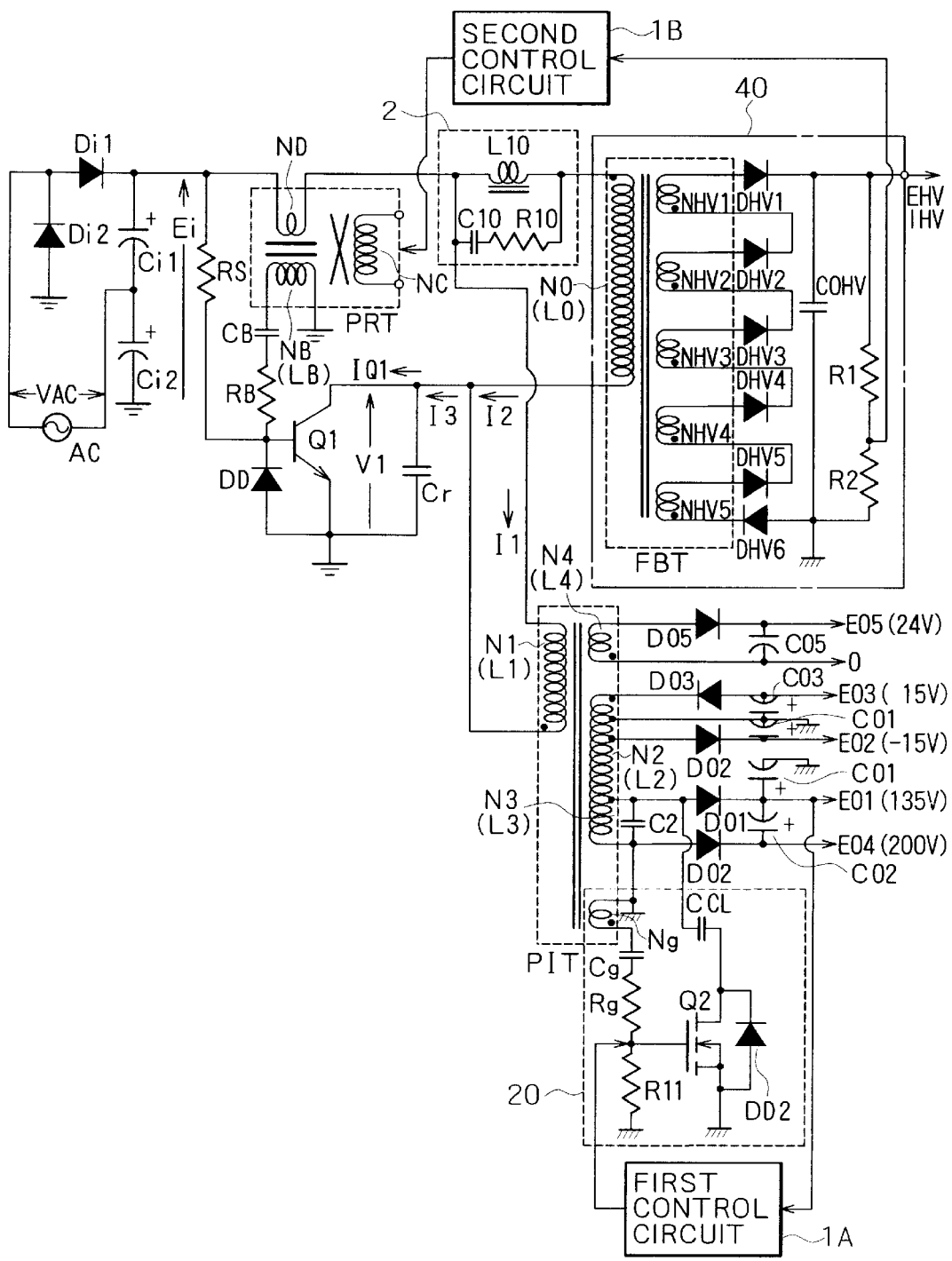
FIG. 3 is a circuit diagram showing a configuration of a switching power supply circuit according to a third embodiment of the present invention.

FIG. 3 shows a configuration of a switching power supply circuit according to a third embodiment of the present invention. In FIG. 3, the same parts as in FIG. 1 are identified by the same reference numerals, and their description will be omitted.

The choke coil CH shown in the foregoing circuit of FIG. 1 is omitted from the power supply circuit shown in FIG. 3. Instead, a high-voltage generating circuit 40 is provided in the power supply circuit shown in FIG. 3. The high-voltage generating circuit 40 is provided to generate a CRT anode voltage having a required high voltage level.

The high-voltage generating circuit 40 is formed by a flyback transformer FBT and a high-voltage rectifier circuit provided on the secondary side of the flyback transformer FBT. Switching output of a switching device Q1 is transmitted to a primary winding N0 of the flyback transformer FBT.

As shown in FIG. 3, the primary winding N0 is wound on the primary side of the flyback transformer FBT. Five step-up windings NHV1, NHV2, NHV3, NHV4, and NHV5 are wound as a secondary winding on the secondary side of the flyback transformer FBT.

As shown in the figure, a winding start point of the primary winding N0 is connected to a positive electrode terminal of a smoothing capacitor Ci1 (rectified and smoothed voltage Ei line) via an inductor L10 of a ringing suppressing circuit 2 to be described later and a resonance current detecting winding ND, whereas a winding end point of the primary winding N0 is connected to a collector of the switching device Q1.

With such a connection, it may be considered that the primary winding N0 (inductance L0) of the flyback transformer FBT is connected in parallel with a primary winding N1 of an isolating converter transformer PIT.

The step-up windings NHV1 to NHV5 are practically wound around a core in a state of being divided and independent of each other. The step-up windings NHV1 to NHV5 are wound such that the step-up windings NHV1 to NHV5 are of opposite polarity from the primary winding N0, whereby flyback operation is obtained.

In the third embodiment, the ringing suppressing circuit 2 is inserted in series between the winding start point of the primary winding N0 and the positive electrode terminal of the smoothing capacitor Ci1 (rectified and smoothed voltage Ei line) with the resonance current detecting winding ND intermediate between the winding start point of the primary winding N0 and the positive electrode terminal of the smoothing capacitor Ci1. Thus, the ringing suppressing circuit 2 is connected in series with the primary winding N0 of the flyback transformer FBT.

As shown in the figure, the ringing suppressing circuit 2 has the inductor L10, a capacitor C10, and a resistance R10. The inductor L10 is inserted in series between the winding start point of the primary winding N0 and the positive electrode terminal of the smoothing capacitor Ci1 with the resonance current detecting winding ND intermediate between the winding start point of the primary winding N0 and the positive electrode terminal of the smoothing capacitor Ci1. A series connection circuit of the capacitor C10 and the resistance R10 is connected in parallel with the inductor L10. Thus, the ringing suppressing circuit 2 forms a so-called LCR parallel resonant circuit, and the LCR parallel resonant circuit is connected in series with the primary winding N0.

As shown in the figure, the step-up windings NHV1, NHV2, NHV3, NHV4, and NHV5 are connected in series with high-voltage rectifier diodes DHV1, DHV2, DHV3, DHV4, and DHV5, respectively, thereby forming a total of five half-wave rectifier circuits. The five half-wave rectifier circuits in multiple stages are further connected in series with one another. Thus, the five half-wave rectifier circuits form a multistage type rectifier circuit. A smoothing capacitor COHV is connected in parallel with the multistage type rectifier circuit formed by the five half-wave rectifier circuits, thus forming a secondary-side rectifying and smoothing circuit.

As shown in the figure, in the third embodiment, an additional high-voltage rectifier diode DHV6 is connected in series between a winding start point of the step-up winding NHV5 and a negative electrode terminal of the smoothing capacitor COHV in the same conducting direction as the high-voltage rectifier diodes DHV1 to DHV5. Thus, the additional high-voltage rectifier diode DHV6 is provided for the lowermost stage of the multistage type rectifier circuit in the current rectifying path of the secondary-side rectifying and smoothing circuit.

Operation of the secondary-side rectifying and smoothing circuit is as follows.

On the secondary side of the flyback transformer FBT, the five half-wave rectifier circuits rectify voltages induced in the step-up windings NHV1 to NHV5 by means of the high-voltage rectifier diodes DHV1 to DHV5 (and the additional high-voltage rectifier diode DHV6), and then store the resulting voltages in the smoothing capacitor COHV. Thereby, a direct-current voltage whose level is equivalent to five times the voltage induced in each of the step-up windings NHV1 to NHV5 is obtained across the smoothing capacitor COHV. Then, the direct-current voltage obtained across the smoothing capacitor COHV is outputted as a high direct-current voltage EHV. The high direct-current voltage EHV is used as anode voltage of a CRT, for example.

A series connection circuit of voltage dividing resistances R1 and R2 is connected in parallel with the smoothing capacitor COHV providing the high direct-current voltage EHV. A voltage dividing point of the voltage dividing resistances R1 and R2 is connected to a second control circuit 1B. Thus, in the third embodiment, a voltage level obtained by dividing the high direct-current voltage EHV by the voltage dividing resistances R1 and R2 is inputted to the second control circuit 1B as a detection voltage.

The second control circuit 1B variably controls the inductance LB of a driving winding NB wound in an orthogonal type control transformer PRT by changing the level of a control direct current flowing through a control winding NC of the orthogonal type control transformer PRT according to change in the high direct-current voltage EHV. This results in a change in resonance conditions of a series resonant circuit including the inductance LB of the driving winding NB in a circuit for self-oscillation driving of a switching device Q1. This represents an operation of changing the switching frequency of the switching device Q1, by which operation energy transmitted from the primary side to the secondary side of the flyback transformer FBT is changed. Control is thus effected so that the high direct-current voltage EHV is maintained at a desired constant level. Thus, the circuit shown in the figure stabilizes the high direct-current voltage EHV by the switching frequency control method.

Figure 6:
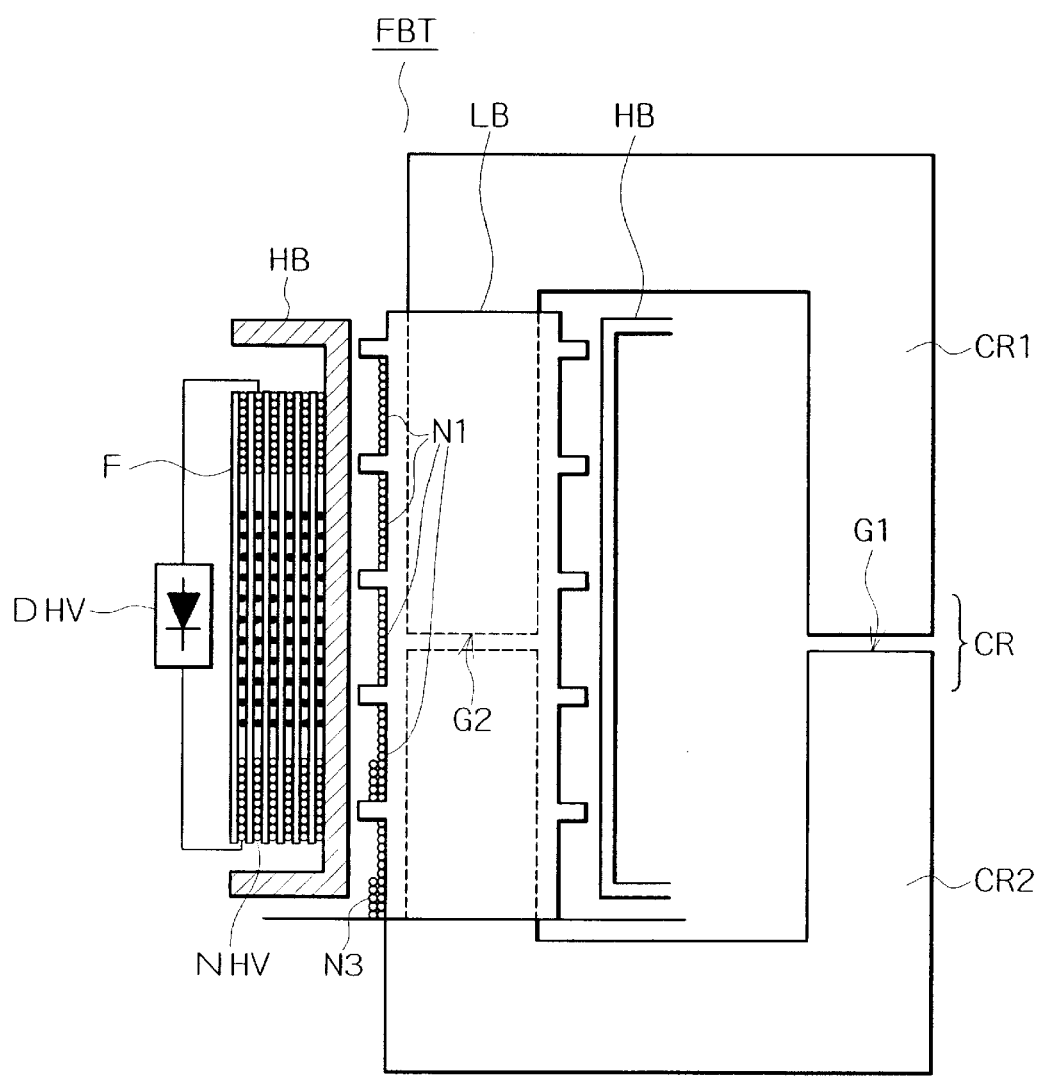
FIG. 6 is a sectional view of a structure of a flyback transformer provided in a high-voltage stabilizing circuit in the third embodiment, in which step-up windings are wound by layer winding.
Figure 7:
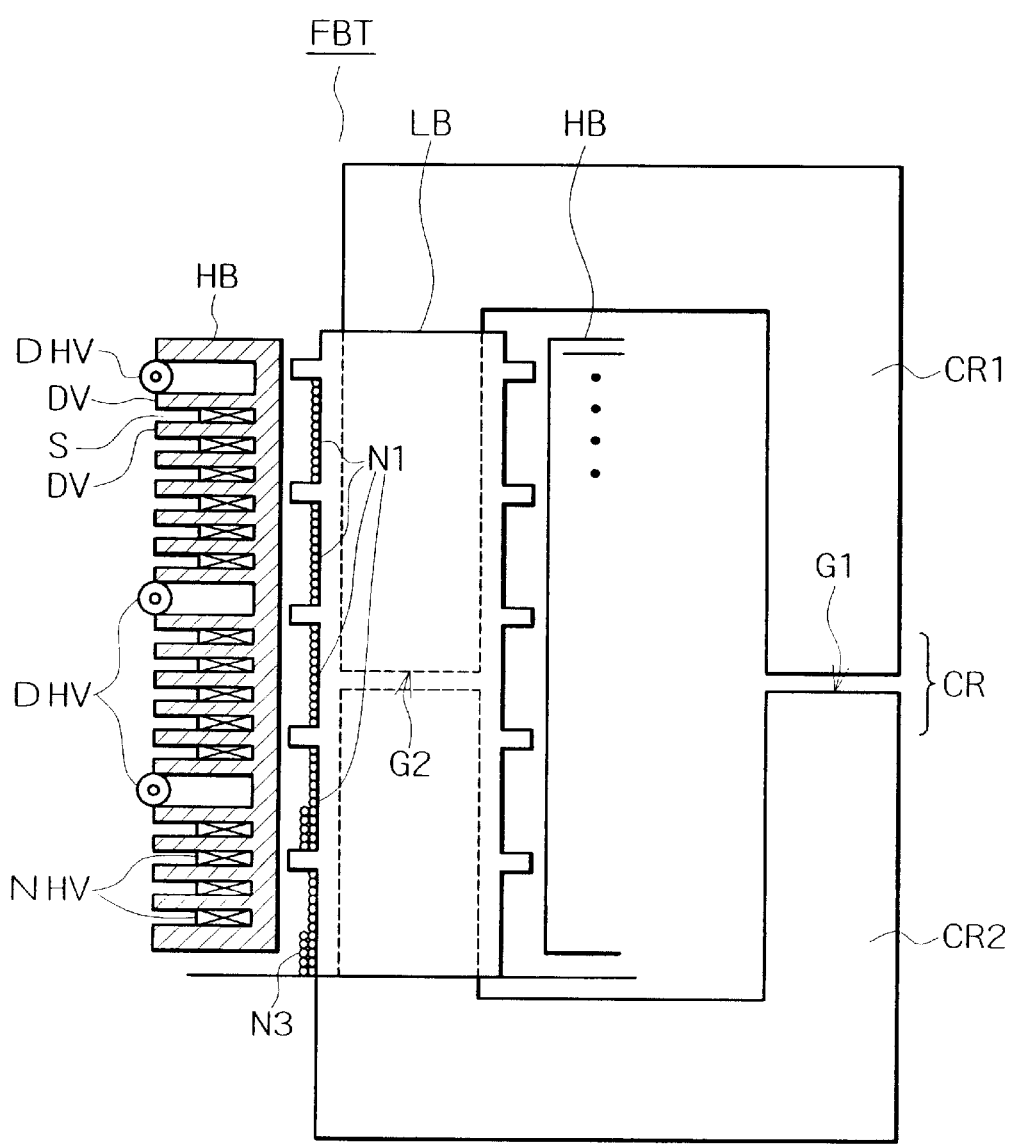
FIG. 7 is a sectional view of a structure of a flyback transformer provided in the high-voltage stabilizing circuit in the third embodiment, in which step-up windings are wound by division winding.

FIG. 6 and FIG. 7 are sectional views of structure examples of the flyback transformer FBT in the third embodiment.

In the flyback transformer FBT shown in FIG. 6, a U—U-shaped core CR is formed by combining two U-shaped cores CR1 and CR2 made for example of a ferrite material in such a manner that magnetic legs of the core CR1 are opposed to magnetic legs of the core CR2. Gaps G1 and G2 are respectively provided in portions where the ends of the magnetic legs of the U-shaped core CR1 are opposed to the ends of the magnetic legs of the U-shaped core CR2. As shown in the figure, a low-voltage winding bobbin LB and a high-voltage winding bobbin HB are attached to one magnetic leg of the U—U-shaped core CR, and the primary winding N0 and the step-up windings NHV (1 to 5) are wound around the low-voltage winding bobbin LB and the high-voltage winding bobbin HB, respectively, in a divided manner.

In this case, the primary winding N0 is wound around the low-voltage winding bobbin LB and the step-up windings NHV are wound around the high-voltage winding bobbin HB. Since the step-up windings NHV (1 to 5) need to be wound around the high-voltage winding bobbin HB in a state of being insulated from each other, for example, the step-up windings NHV are wound by a so-called layer winding method, which inserts an interlayer film F between two winding layers each obtained by winding a wire of the step-up winding NHV by a predetermined number of turns.

Then, the U—U-shaped core CR, the primary winding N0, and the step-up windings NHV are filled with a filler such for example as a high polymer epoxy resin to thereby ensure insulation of the U—U-shaped core CR, the primary winding N0, and the step-up windings NHV.

The step-up windings NHV (1 to 5) are wound in a manner as described above, and the high-voltage rectifier diodes DHV (1 to 5) are connected and attached to the step-up windings NHV (1 to 5), respectively, so that the circuit configuration shown in FIG. 3 is obtained.

In order to insulate the step-up windings NHV (1 to 5) from each other, a structure formed by so-called slit winding as shown in FIG. 7 may be employed in addition to the structure shown in FIG. 6. In FIG. 7, the same parts as in FIG. 6 are identified by the same reference numerals, and their description will be omitted.

When the step-up windings NHV are wound by division winding, dividers DV are formed integrally with the inside of a high-voltage winding bobbin HB1, as shown in the figure. Thus, a plurality of slits S or winding regions are formed between the adjacent dividers DV. The step-up windings NHV are wound in the slits S, whereby insulation between the step-up windings NHV is obtained.

Incidentally, each of FIG. 6 and FIG. 7 shows a tertiary winding N3 wound in part of the divided regions of the low-voltage winding bobbin LB to suppose a case where to obtain a low direct-current voltage on the primary side, for example, the tertiary winding N3 for generating a low alternating voltage serving as a source of the low direct-current voltage needs to be wound.

The third embodiment employs the structure of the flyback transformer FBT shown in FIG. 6 or FIG. 7, and the primary winding N0 on the primary side and the step-up windings NHV (1 to 5) on the secondary side are closely coupled with each other.

Since the power supply circuit according to the third embodiment has the high-voltage generating circuit 40 including the flyback transformer FBT, power loss itself is increased because of the high-voltage generating circuit 40, but as described above, ZVS is ensured. Therefore, it is possible to reduce input power and consequently improve power conversion efficiency more than when a power supply circuit as the high-voltage generating circuit and a power supply circuit including the isolating converter transformer PIT for supplying low supply voltages are included separately from each other, for example.

Specifically, since the third embodiment increases a margin of a ZVS operation range by adding the primary winding N0 of the flyback transformer FBT, capacitance of a secondary-side parallel resonant capacitor C2 does not need to be increased, and therefore a secondary-side parallel resonant circuit can maintain a high resonance frequency. Thus, the maximum load power that can be handled is not decreased.

Thus, when the number of turns of the primary winding N1 is increased and the maximum load power that can be handled is set at about the same level as in the circuit of FIG. 8, the level of primary winding currents I1 and I3 and a collector current Icp is lower than that of the circuit of FIG. 8. Also, the level of resonance current of the secondary-side parallel resonant circuit flowing through a secondary winding N2 is lowered. Thus, power loss in the switching device Q1 and the isolating converter transformer PIT is reduced, and overall input power of the circuit as a whole is reduced.

The third embodiment has the ringing suppressing circuit 2 on the primary side. As described above, the ringing suppressing circuit 2 forms an LCR resonant circuit, and is connected to the primary winding N0.

An alternating current flows through the primary winding N0 as switching output in response to on/off operation of the switching device Q1 on the primary side. A ringing current component superimposed on the switching output current flowing through the primary winding N0 flows as a resonance current in the LCR resonant circuit as the ringing suppressing circuit 2. Thus, the ringing component superimposed mainly on the current flowing on the primary side is absorbed and suppressed. Also, as a result, the ringing current does not flow to a depletion layer capacitance of the switching device Q1, for example.

Such operation is shown in the waveform diagrams of FIGS. 4A to 4J described above. Specifically, only a slight harmonic ringing component is superimposed on the current waveforms shown in FIGS. 4B, 4C, 4D, and 4E. Portions of the waveforms in the level increasing period TON are like a linear line, with substantially no ringing current superimposed thereon. The waveform of a collector current IQ1 shown in FIG. 4E, in particular, is at a zero level during the period TOFF, with no ringing component superimposed thereon.

Since the third embodiment prevents the ringing current from flowing to the depletion layer capacitance of the switching device Q1, as described above, it is possible to substantially reduce power loss, and consequently to substantially improve power conversion efficiency.

In addition, the suppression of the ringing component superimposed on the current flowing through the circuit leads to a decrease in output impedance of the flyback transformer FBT. Therefore, even when reducing a variable control range of switching frequency fs, voltage variation characteristics equal to or better than those of the circuit of FIG. 8 can be obtained.

Experimental results of the power supply circuit according to the third embodiment shown in FIG. 3 will be shown in the following. Main components are selected as follows in obtaining the experimental results.

Primary winding N0 of flyback transformer FBT=60 T
Step-up windings NHV (NHV1–NHV2–NHV3–NHV4–NHV5)=530 T
Primary-side parallel resonant capacitor Cr=5600 pF
Primary winding N1 of isolating converter transformer PIT=130 T
Secondary winding N2=50 T
Tertiary winding N3=24 T
Independent secondary winding N4=9 T
Secondary-side parallel resonant capacitor C2=0.01 $\mu$F
Clamp capacitor CCL=0.39 $\mu$F Each of the components is selected as described above, and conditions are: alternating input voltage VAC=100 V; and high direct-current voltage EHV=31.5 KV; and as for load variation, high direct current IHV=2.15 mA to 0 mA; load PHV of the high direct-current voltage EHV=68 W to 0 W; and load Po of low secondary-side direct-current output voltage E01=150 W to 100 W.

As characteristics under such conditions, the results obtained show that at a maximum load power of 218 W, the power conversion efficiency is 88.2% and the alternating-current input power is 247.2 W, whereas at a minimum load power of 100 W, the power conversion efficiency is 84.4% and the alternating-current input power is 118.5 W.

The switching frequency fs of the switching device Q1 on the primary side is fs=60 KHz to 65.5 KHz at the alternating input voltage VAC=100 V in the foregoing load variation ranges. Thus, its controlled range can be reduced to a mere 5.5 KHz.

Thus, as a power supply circuit to be incorporated in a television receiver, the power supply circuit according to the third embodiment employs a configuration that integrates the power supply circuit for generating a plurality of low supply voltages and a high-voltage regulator circuit for generating the anode voltage of the CRT. The power supply circuit also secures stable ZVS, as described above, and employs a configuration for suppressing the ringing component superimposed on the current flowing through the circuit.

Thus, the power supply circuit is highly reliable as a power supply circuit to be incorporated in a television receiver, and provides excellent power conversion efficiency characteristics.

According to the foregoing embodiments, the orthogonal type control transformer is used to effect constant-voltage control in the configuration provided with the self-excited resonance converter on the primary side; however, an oblique type control transformer may be employed instead of the orthogonal type control transformer.

The structure of the oblique type control transformer is a cubic core formed by combining two table-shaped cores each having four magnetic legs with each other. A control winding NC and a driving winding NB are wound around the cubic core in obliquely crossing winding relation to each other. The oblique type control transformer operates in such a manner that inductance of the driving winding is increased even when alternating current flowing through the driving winding is changed from a negative current level to a positive current level. Thus, the level of current in a negative direction for turning off the switching device is increased, and storage time of the switching device is shortened. As a result of this, fall time of the switching device at turn-off is also shortened, thereby enabling further reduction of power loss in the switching device.

In the circuits according to the first, second, and third embodiments of the present invention, a self-excited voltage resonance type converter employing a single-ended system is described as an example of a switching converter to be provided on the primary side; however, an externally excited configuration, for example, may be employed. In addition, a self-excited or externally excited voltage resonance type converter employing a so-called push-pull system that is provided with two switching devices, for example, may be used. Furthermore, in the circuits according to the first, second, and third embodiments of the present invention, the parallel resonant capacitor connected in parallel with the secondary-side winding of the converter transformer is taken as an example; however, a series resonant capacitor connected in series with the secondary-side winding may be used.

While a preferred embodiment of the present invention has been described using specific terms, such description is for illustrative purposes only, and it is to be understood that changes and variations may be made without departing from the spirit or scope of the following claims.

What is claimed is:

1. A switching power supply circuit, comprising:
    switching means including a switching device driven by a switching drive for performing a switching operation on a direct-current input voltage inputted to said switching means;
    a first isolating converter transformer having a primary-side winding and a plurality of secondary-side windings for transmitting an output of said switching means obtained in said primary-side winding to said plurality of secondary-side windings;
    a primary-side parallel resonant circuit formed by said primary-side winding and a primary-side parallel resonant capacitor for converting an operation of said switching means into a voltage-resonance-type operation;
    an insertable choke coil separate and apart from said first isolating converter transformer and connected in parallel with said primary-side winding for reducing an input power to said first isolating converter transformer;
    a secondary-side resonant circuit formed by connecting a secondary-side resonant capacitor in parallel with a first secondary-side winding of said plurality of secondary-side windings;
    first direct-current output voltage generating means for providing a first secondary-side direct-current output voltage by performing a rectifying operation on an alternating voltage obtained in said first secondary-side winding and inputted to said first direct-current output voltage generating means; and
    second direct-current output voltage generating means for providing a second secondary-side direct-current output voltage by performing a rectifying operation on an alternating voltage obtained in a second secondary-side winding of said plurality of secondary-side windings and inputted to said second direct-current output voltage generating means, and for supplying a layer load power than said first direct-current output voltage generating means.

2. The switching power supply circuit as claimed in claim 1, wherein
    said choke coil is a primary-side winding of a second isolating converter transformer; and said switching power supply circuit includes third direct-current voltage generating means for providing a third secondary-side direct-current output voltage by performing a rectifying operation on an alternating voltage that is obtained in a third secondary-side winding of said second isolating converter transformer by transmitting said output of said switching means obtained in a primary-side winding of said second isolating converter transformer to said third secondary-side winding of said second isolating converter transformer, and inputting said third secondary-side direct-current output voltage to said second direct-current output voltage generating means.

3. The switching power supply circuit as claimed in claim 1, wherein said choke coil is a primary winding of a high voltage output transformer; and said switching power supply circuit includes high direct-current voltage generating means for: receiving a stepped-up alternating voltage having a high voltage level; and generating and outputting a high direct-current voltage having said high voltage level, said stepped-up alternating voltage being induced by said primary winding of said high-voltage output transformer and induced in a secondary winding of said high voltage output transformer.

4. The switching power supply circuit as claimed in claim 3, wherein said secondary winding of said high voltage output transformer is divided into a plurality of high-voltage secondary windings; and said high direct-current voltage generating means generates and outputs said high direct-current voltage having said high voltage level, said high direct-current voltage generating means including a multistage rectifier circuit formed by inserting a rectifier diode in series with each of said plurality of high-voltage secondary windings for rectifying said stepped-up alternating voltage and a smoothing capacitor for smoothing a rectified output of said multistage rectifier circuit.

5. The switching power supply circuit as claimed in claim 3, further comprising constant-voltage control means for performing constant-voltage control on said high direct-current voltage by controlling a switching frequency of said switching device of said switching means according to said level of said high direct-current voltage.

6. The switching power supply circuit as claimed in claim 3, further comprising:

an active clamp circuit having an auxiliary switching device for clamping said alternating voltage obtained in said secondary-side resonant circuit; and constant-voltage control means for performing constant-voltage control on said first secondary-side direct-current output voltage by variably controlling a conduction angle of said auxiliary switching device according to said level of said first secondary-side direct-current output voltage.

* * * * *